3,180,735
ANIMAL FEED CONTAINING UREA ADDITION COMPLEX

Harry W. Titus, Newton, N.J., assignor of two-thirds to Limestone Products Corporation of America, Newton, N.J., a corporation of New Jersey
No Drawing. Filed Dec. 14, 1961, Ser. No. 159,463
9 Claims. (Cl. 99—2)

This application is a continuation-in-part of my copending application Serial No. 530,209, filed August 23, 1955, now abandoned.

This invention relates to novel animal feed compositions, especially for the feeding of ruminants. More particularly, the invention concerns animal feed compositions which contain as a supplementary source of nitrogen one or more addition complexes of unsubstituted urea with inorganic compounds.

Farm animals are commonly grouped into two classifications: ruminant and monogastric. Ruminant animals, which include cattle and sheep, and which chew their cud, have a complex stomach of several compartments. The first stomach, lying next to the reticulum, is known as the rumen. It is generally believed that in the rumen, nitrogen fed to the animal is converted into protein. Conventionally, the major portion of nitrogen required by the animal is supplied in the form of grain protein. However, in recent years there has been a trend toward supplying a portion of the nitrogen, perhaps as much as one-third, by incorporating urea in the feed. As a non-proteinaceous source of nitrogen, urea is attractive in feeding ruminants because it represents a more concentrated and economical form of nitrogen. Pure urea contains about 46.65% N, but the amount that may be safely incorporated in animal feeds is limited by the fact that it possesses a definite toxicity limit toward ruminants. Accordingly the art has long sought a practical and economical way of utilizing urea in animal feeds while at the same time minimizing its toxic propensities. As presently utilized in animal feeds, urea must be supplied in limited amounts, for if too much is included in the feed, or if it is not well blending with the other ingredients, digestive or other disturbances may result which may even be severe enough to cause death.

In accordance with the invention there are provided novel compositions for the feeding of ruminants in which urea is present either wholly or partly in chemical combination with inorganic nutrients. This novel concept has the twofold advantage of introducing into the feed composition urea nitrogen in a form which has minimal or no toxicity, while simultaneously providing other important inorganic or mineral nutrients in a concentrated and readily assimilable form to the animal. By providing a new and safe form of urea the invention permits the administration of increased amounts of urea without danger of harmful side-effects. At the same time the urea carries with it into the digestive system of the animal selected and predeterminable quantities of phosphorus, calcium, sodium, and other inorganic substances which its combinations supply to the feed.

The novel feed compositions of the invention include as an active nutrient ingredient one or more addition complexes of unsubstituted urea with inorganic compounds. Unsubstituted urea possesses the property of forming molecular addition complexes with numerous inorganic acids and salts. These addition complexes are formed by the combination of urea with the salt or acid in molar ratios which are whole numbers. In some instances a mol of water may be included. No chemical reaction or neutralization takes place in the formation of these complexes, and the phenomenon is entirely one of molecular addition.

It has been proposed to employ complexes of substituted urea with organic amides to combat coccidiosis in poultry, and in U.S. Patent 2,731,383 there are mentioned, inter alia, complexes of 4,4'-dinitrothiocarbanilide with dimethylformamide or dimethylacetamide for this purpose. These organic complexes differ fundamentally in chemical composition and characteristics from the unsubstituted urea inorganic compound complexes employed in accordance with the present invention, and would not function in ruminant feed compositions to supply nitrogen and mineral nutrients in assimilable form as do the complexes which are the subject of this invention. In U.S. Patent 2,875,060 it suggested that inclusion compounds of urea with long chain aliphatic acids, such as arachidonic acid, when added to animal feeds, act to supply fatty acids to the diet, and to preserve the feed against autooxidation or rancidity. Inclusion compounds are not considered to be similar to molecular addition complexes of urea with inorganic compounds, and moreover, they too would not function to supply mineral nutrients in combination with the urea as in the present invention.

The novel feed compositions of the invention include as an active ingredient and supplementary source of nitrogen supply one or more individual addition complexes of unsubstituted urea with inorganic compounds, together with roughage ingredients of conventional type, furnishing carbohydrates, fiber and protein such as, for example, grass, hay, straw, silage, pulp, and the like. In the final feed composition as consumed by the ruminant, the proportion of urea addition complex will be comparatively small. There are embraced within the contemplation of the invention not only ultimate feed compositions of the kind mentioned, but also intermediate feed concentrates or feed supplements which are adapted to be blended with roughage and other ingredients to prepare the final feed. In feeding ruminants, especially dairy cattle, the non roughage portion of the total feed is commonly referred to as a concentrate. In the feed industry the term concentrate is often used to denote a product which contains a relatively large quantity of one or more nutrients or groups of nutrients, such as protein or protein-equivalent, minerals, vitamins, and the like, and which is adapted for addition to roughage ingredients to form the total or final feed. The term supplement is also used to denote a specific feedstuff or nutrient or mixture thereof that is either added to or included in the concentrate portion of the total feed, or in the total feed itself.

The addition complexes of unsubstituted urea with inorganic compounds may be employed, in accordance with the present invention, in preparing (1) supplements to be added to or included in the total feed; (2) feed concentrates, such as protein-mineral concentrates or protein-mineral-vitamin concentrates to be included in, or to comprise the concentrate portion of the total feed; and (3) the total feed itself.

Addition complexes of unsubstituted urea with inorganic acids which may be employed in accordance with the invention include, for example, the following:

Urea phosphate, $CO(NH_2)_2 \cdot H_3PO_4$, rhombic crystals, readily soluble in water;

Urea nitrate, $CO(NH_2)_2 \cdot HNO_3$, white leaflets, M. 152° C., sparingly soluble in cold water.

Addition complexes of unsubstituted urea with inorganic salts which may be employed in accordance with the invention include those formed with metal and ammonium salts of inorganic acids, such as halides, phosphates, sulfates, carbonates, nitrates, and the like. The metals are preferably those which possess value as mineral constituents or trace elements in the feed. They include alkali metals, such as sodium and potassium, alkaline earth metals such as calcium, magnesium, zinc, iron (both ferrous and ferric), copper, manganese, and cobalt.

Examples of metal salts forming addition complexes with urea include sodium chloride, sodium sulfate, sodium phosphate, calcium sulfate, calcium iodate, potassium-ammonium phosphate, ferrous carbonate, ferrous sulfate, manganese sulfate, cobalt sulfate, copper sulfate, and zinc sulfate. Typical urea-inorganic salt addition complexes suitable for use in the invention include:

Urea-sodium chloride-water, $CO(NH_2)_2 \cdot NaCl \cdot H_2O$, rhombic prisms, M. 60°–70° C., readily soluble in water.

Urea-calcium sulfate, $4CO(NH_2)_2 \cdot CaSO_4$.

In accordance with one aspect of the invention, the urea addition complexes are incorporated in feed supplements and concentrates with the result that they supply valuable nutrient elements in addition to nitrogen. To make the most efficient use of the urea addition complexes, it is advantageous to employ two or more of the complexes in a given concentrate, the choice being determined by the desired additional inorganic elements, such as phosphorus, sulfur, calcium, and the like. The balance of feed supplement can comprise any suitable grain material, such as corn, oats, barley, wheat, milo, oilseed meal, in any suitable form, whole, flaked or ground. In the preparation of feed concentrates there may be included with the urea complex various inorganic ingredients such as calcium carbonate (limestone), vitamins, commercial trace element pre-mixes, and so on.

The amount of urea addition complex to be used in the preparation of feed supplements and concentrates is not critical, and will depend upon the amount of nitrogen (protein) available from other components of the total feed. The amount of any individual urea complex used will also depend upon the extent to which other urea complexes are used in conjunction therewith. It will also depend upon the extent to which uncombined urea is utilized in the concentrate or supplement, for the invention also contemplates the conjoint use of uncombined urea and one or more urea addition complexes.

In the preparation of feed supplements and concentrates in accordance with the invention, the approximate percentage ranges of various urea addition complexes which may be employed are indicated in the following table:

TABLE 1

| Urea addition complex: | Percent range of use in feed concentrate |
|---|---|
| Urea-phosphoric acid | 5.0 to 35.0 |
| Urea-sodium chloride-water | 5.0 to 40.0 |
| Urea-calcium sulfate | 5.0 to 50.0 |
| Urea-magnesium sulfate | 0.5 to 5.0 |
| Urea-sodium sulfate | 0.5 to 5.0 |
| Urea-sodium phosphate | 1.0 to 10.0 |
| Urea-potassium ammonium phosphate | 1.0 to 10.0 |
| Urea-ferrous carbonate | 0.1 to 1.0 |
| Urea-ferrous sulfate | 0.1 to 1.0 |
| Urea-manganese sulfate | 0.05 to 0.5 |
| Urea-zinc sulfate | 0.05 to 0.5 |
| Urea-copper sulfate | 0.01 to 0.1 |
| Urea-calcium iodate | 0.001 to 0.05 |
| Urea-cobalt sulfate | 0.001 to 0.05 |

In accordance with another aspect of the invention, one or more urea addition complexes may be incorporated in a feed supplement or concentrate together with uncombined urea, thus enabling a reduction in the amount of free urea present. In such concentrates, the amount of free urea may range from about 0.5% to 50%, while the individual urea addition complexes may be employed in the ranges indicated in Table 1. Other mineral ingredients, such as limestone, may be included in the feed concentrate in amounts ranging, for example, from about 0.5% to about 35%. All the foregoing percentages are by weight.

The feed concentrates of the invention are incorporated with typical feed ingredients such as corn cobs, grains, oat hulls, and other dry roughage, to form total feeds (also referred to as mixed, formula, or complete feeds), in an amount ranging from about 1% to about 12% by weight, depending upon the desired final composition and nutritional balance of the feed.

This principle is illustrated by an example of a feed concentrate which represents a preferred embodiment of the invention, and which is capable of supplying nitrogen, phosphorus, calcium, sulfur, and sodium. The ingredients are dry mixed, in comminuted form, in the proportions indicated by the following ranges:

| Ingredient | Overall range (percent or parts by weight) | Optimal range (percent or parts by weight) |
|---|---|---|
| Urea-phosphoric acid | 5.0–35 | 15–20 |
| Urea-calcium sulfate | 5.0–50 | 20–30 |
| Urea-sodium chloride-water | 5.0–40 | 15–25 |
| Urea | 0.5–50 | |
| Calcium carbonate | 0.5–35 | |

A specific example of a feed concentrate formulation of the foregoing character obtained by dry mixing of the ingredients in the proportions shown is as follows.

*Example 1*

| Ingredient: | Percent |
|---|---|
| Urea-phosphoric acid | 17.35 |
| Urea-calcium sulfate | 22.95 |
| Urea-sodium chloride-water | 19.85 |
| Urea | 28.35 |
| Calcium carbonate (limestone) | 11.50 |
| Total | 100.00 |

The foregoing concentrate is incorporated into a mixed feed in an amount of about 5.9% of the total feed, the other feed ingredients including, for example, corn cobs, straw, oat hulls, or similar items commonly fed to ruminants.

It is to be noted that when, for example, 5.9% of the feed concentrate of Example 1 is included in the total feed of a ruminant, it will supply 0.2% of phosphorus to the total feed ($0.059 \times 17.35 \times 0.19597 = 0.20060$). This is ordinarily about as much phosphorus as is needed, but as much as 0.4% of phosphorus may be included in the total feed. Thus, for practical purposes, the upper limit of the urea-phosphoric acid complex in the feed concentrate is about 35%, as indicated above.

Similarly, when 5.9% of the concentrate of Example 1 is included in the total feed of a ruminant, it will furnish about 0.144% of calcium and about 0.115% of sulfur. The latter is about the normal requirement of sulfur when the nitrogen content of the total feed is 1.6%, but twice that amount of sulfur may be supplied to the total feed by adjustment of the concentration of urea-calcium sulfate in the feed concentrate. However, for a phosphorus level of 0.2%, the calcium level in the total feed should be about 0.24% in some instances and not greatly in excess of 0.4% in general. Hence an adjustment of calcium in the concentrate can be made by changing the amount of limestone added, as desired. The free urea in the concentrate can serve to bring the total nitrogen content of the feed concentrate to the desired level of about 27.2%, equivalent to about 1.6% nitrogen in the total feed. Thus, it will be seen that the combining and variation of amounts of the different urea complexes, and of free urea, and the addition of urea addition complexes with trace element salts can serve to provide a nutritionally well-balanced concentrate and scientifically formulated feed, by the practice of the invention.

The following examples illustrate embodiments of the invention in the form of feed supplements, feed concentrates, and total feed preparations and compositions. All percentages given are by weight. The ingredients are mixed dry, or where liquids are involved, are mixed until homogeneous, according to conventional feed mixing procedures.

The following are examples of feed supplements containing at least one urea addition complex, with or without additional free urea, and a grain. In place of the stated grain, any other suitable grain may be used to replace all or a part. The grain may be in any suitable form, such as whole, flaked, or ground. It is to be understood that in the column designated "Optimal range," the percentages are selected to total 100.

Example 2
UREA-PHOSPHORIC ACID COMPLEX SUPPLEMENTS

| Ingredient | Percent | |
|---|---|---|
| | Typical | Optimal range |
| Urea-phosphoric acid complex | 17.35 | 15-20 |
| Corn | 82.65 | 80-85 |
| Total | 100.00 | 100 |

Example 3
UREA-CALCIUM SULFATE COMPLEX SUPPLEMENTS

| Ingredient | Percent | |
|---|---|---|
| | Typical | Optimal range |
| Urea-calcium sulfate complex | 22.95 | 20-30 |
| Oats | 77.05 | 70-80 |
| Total | 100.00 | 100 |

Example 4
UREA-SODIUM CHLORIDE-WATER COMPLEX SUPPLEMENTS

| Ingredient | Percent | |
|---|---|---|
| | Typical | Optimal range |
| Urea-sodium chloride-water complex | 19.85 | 15-25 |
| Milo | 80.15 | 75-85 |
| Total | 100.00 | 100 |

Example 5
UREA, UREA-PHOSPHORIC ACID COMPLEX SUPPLEMENTS

| Ingredient | Percent | |
|---|---|---|
| | Typical | Optimal range |
| Urea-phosphoric acid complex | 17.35 | 15-20 |
| Urea (free urea) | 28.35 | 25-30 |
| Barley | 54.30 | 50-60 |
| Total | 100.00 | 100 |

Example 6
UREA, UREA-CALCIUM SULFATE COMPLEX SUPPLEMENTS

| Ingredient | Percent | |
|---|---|---|
| | Typical | Optimal range |
| Urea-calcium sulfate complex | 22.95 | 20-30 |
| Urea (free urea) | 28.35 | 25-30 |
| Wheat | 48.70 | 40-55 |
| Total | 100.00 | 100 |

Example 7
UREA, UREA-SODIUM CHLORIDE-WATER COMPLEX SUPPLEMENTS

| Ingredient | Percent | |
|---|---|---|
| | Typical | Optimal range |
| Urea-sodium chloride-water complex | 18.55 | 15-25 |
| Urea (free urea) | 28.35 | 25-30 |
| Corn | 53.10 | 45-60 |
| Total | 100.00 | 100 |

Example 8
UREA-PHOSPHORIC ACID COMPLEX, UREA-CALCIUM SULFATE COMPLEX SUPPLEMENTS

| Ingredient | Percent | |
|---|---|---|
| | Typical | Optimal range |
| Urea-phosphoric acid complex | 17.35 | 15-20 |
| Urea-calcium sulfate complex | 22.95 | 20-30 |
| Corn | 59.70 | 50-65 |
| Total | 100.00 | 100 |

Example 9
UREA-PHOSPHORIC ACID COMPLEX, UREA-SODIUM CHLORIDE-WATER COMPLEX SUPPLEMENTS

| Ingredient | Percent | |
|---|---|---|
| | Typical | Optimal range |
| Urea-phosphoric acid complex | 17.35 | 15-20 |
| Urea-sodium chloride-water complex | 19.85 | 15-25 |
| Oats | 62.80 | 55-70 |
| Total | 100.00 | 100 |

Example 10
UREA-CALCIUM SULFATE COMPLEX, UREA-SODIUM CHLORIDE-WATER COMPLEX SUPPLEMENTS

| Ingredient | Percent | |
|---|---|---|
| | Typical | Optimal range |
| Urea-calcium sulfate complex | 22.95 | 20-30 |
| Urea-sodium chloride-water complex | 19.85 | 15-25 |
| Milo | 57.20 | 45-65 |
| Total | 100.00 | 100 |

Example 11
UREA, UREA-PHOSPHORIC ACID COMPLEX, UREA-CALCIUM SULFATE COMPLEX SUPPLEMENTS

| Ingredient | Percent | |
|---|---|---|
| | Typical | Optimal range |
| Urea-phosphoric acid complex | 17.35 | 15-20 |
| Urea-calcium sulfate complex | 22.95 | 20-30 |
| Urea (free urea) | 28.35 | 25-30 |
| Barley | 31.35 | 20-40 |
| Total | 100.00 | 100 |

Example 12
UREA, UREA-PHOSPHORIC ACID COMPLEX, UREA-SODIUM CHLORIDE-WATER COMPLEX SUPPLEMENTS

| Ingredient | Percent | |
|---|---|---|
| | Typical | Optimal range |
| Urea-phosphoric acid complex | 17.35 | 15-20 |
| Urea-sodium chloride-water complex | 19.85 | 15-25 |
| Urea (free urea) | 28.35 | 25-30 |
| Milo | 34.45 | 25-45 |
| Total | 100.00 | 100 |

Example 13

UREA, UREA-CALCIUM SULFATE COMPLEX, UREA-SODIUM CHLORIDE-WATER COMPLEX SUPPLEMENTS

| Ingredient | Percent | |
|---|---|---|
| | Typical | Optimal range |
| Urea-calcium sulfate complex | 22.95 | 20-30 |
| Urea-sodium chloride-water complex | 19.85 | 15-25 |
| Urea (free urea) | 28.35 | 25-30 |
| Oats | 28.85 | 15-40 |
| Total | 100.00 | 100 |

The following are examples of feed concentrates, in which more than two addition-complexes of urea are used:

UREA-MINERAL CONCENTRATES

Example 14

| Ingredient | Percent | |
|---|---|---|
| | Typical | Optimal range |
| Urea-phosphoric acid complex | 17.35 | 15-20 |
| Urea-calcium sulfate complex | 22.95 | 20-30 |
| Urea-sodium chloride-water complex | 19.85 | 15-25 |
| Calcium carbonate (or limestone) | 11.50 | 10-15 |
| Cottonseed meal* | 28.35 | 10-40 |
| Total | 100.00 | 100 |

*Any oil-seed meal or any grain may be used in place of all or a part of the cottonseed meal.

Example 15

| Ingredient | Percent | |
|---|---|---|
| | Typical | Optimal range |
| Urea-phosphoric acid complex | 17.35 | 15-20 |
| Urea-calcium sulfate complex | 22.95 | 20-30 |
| Urea-sodium chloride-water complex | 19.85 | 15-25 |
| Urea | 28.35 | 15-20 |
| Calcium carbonate (or limestone) | 11.50 | 25-30 |
| Total | 100.00 | 100 |

Example 16

| Ingredient | Percent | |
|---|---|---|
| | Typical | Optimal range |
| Urea-phosphoric acid complex | 17.00 | 15-20 |
| Urea-calcium sulfate complex | 22.55 | 20-25 |
| Urea-sodium chloride-water complex | 19.50 | 15-20 |
| Urea | 27.90 | 15-30 |
| Calcium carbonate (or limestone) | 11.40 | 3.5-33 |
| Commercial trace-mineral pre-mix | 1.65 | 1.5-2 |
| Total | 100.00 | 100 |

Example 17

| Ingredient | Percent | |
|---|---|---|
| | Typical | Optimal range |
| Urea-phosphoric acid complex | 17.00 | 15-20 |
| Urea-calcium sulfate complex | 13.10 | 10-15 |
| Urea-sodium chloride-water complex | 19.50 | 15-20 |
| Urea-magnesium sulfate complex | 11.30 | 10-15 |
| Urea-potassium sulfate complex | 22.45 | 20-25 |
| Calcium carbonate (or limestone) | 15.00 | 3.5-28 |
| Commercial trace-mineral pre-mix | 1.65 | 1.5-2 |
| Total | 100.00 | 100 |

Example 18

| Ingredient | Percent | |
|---|---|---|
| | Typical | Optimal range |
| Urea-phosphate complex | 15 | 12-18 |
| Urea-calcium sulfate complex | 10 | 8-12 |
| Urea-sodium chloride-water complex | 19.5 | 15-25 |
| Urea-magnesium sulfate complex | 10. | 8-12 |
| Urea-potassium sulfate complex | 20. | 18-22 |
| Corn gluten meal* | 8.85 | 4-10 |
| Calcium carbonate (or limestone) | 15. | 5.5-27 |
| Commercial trace-mineral pre-mix | 1.65 | 1.5-2 |
| Total | 100.00 | 100 |

*Any oil-seed meal or any grain may be used in place of all or a part of the corn gluten meal.

UREA-MINERAL-VITAMIN CONCENTRATES

Example 19

Urea-mineral concentrate (Example 14) plus 12,000,000–144,000,000 I.U. of vitamin A per ton and 1,200,000–14,400,000 I.U. of vitamin D per ton.

Example 20

Urea-mineral concentrate (Example 15) plus 12,000,000–144,000,000 I.U. of vitamin A per ton and 1,200,000–14,400,000 I.U. of vitamin D per ton.

Example 21

Urea-mineral concentrate (Example 16) plus 12,000,000–144,000,000 I.U. of vitamin A per ton and 1,200,000–14,400,000 I.U. of vitamin D per ton.

Example 22

Urea-mineral concentrate (Example 17) plus 12,000,000–144,000,000 I.U. of vitamin A per ton and 1,200,000–14,400,000 I.U. of vitamin D per ton.

Example 23

Urea-mineral concentrate (Example 18) plus 12,000,000–144,000,000 I.U. of vitamin A per ton and 1,200,000–14,400,000 I.U. of vitamin D per ton.

The following are examples of total feed compositions in which one or more addition-complexes of urea are used:

Example 24

| Ingredient | Percent | |
|---|---|---|
| | Specific | Range |
| Supplement containing one or more addition-complexes of urea | 10 | 5-20 |
| Grain (or commercial concentrate*) | 12 | 5-25 |
| Hay | 28 | 20-35 |
| Other dry roughage | 4 | 0-5 |
| Succulent feeds | 46 | 10-60 |
| Total | 100 | 100 |

* Not containing added urea.

Example 25

| Ingredient | Percent | |
|---|---|---|
| | Specific | Range |
| Urea-mineral concentrate containing 3 to 5 or more addition complexes of urea | 7 | 5-15 |
| Grain (or commercial concentrate*) | 15 | 10-20 |
| Hay | 28 | 20-35 |
| Other dry roughage | 4 | 0-5 |
| Succulent feeds | 46 | 5-60 |
| Total | 100 | 100 |

*Not containing added urea.

Example 26

| Ingredient | Percent | |
|---|---|---|
| | Specific | Range |
| Urea-mineral-vitamin concentrate containing 3 to 5 or more addition complexes of urea | 8 | 5-15 |
| Grain (or commercial concentrate*) | 12 | 10-15 |
| Hay | 40 | 30-50 |
| Other dry roughage | 4 | 0-10 |
| Succulent feeds | 36 | 0-50 |
| Total | 100 | 100 |

*Not containing added urea.

Example 27

| Ingredient | Percent | |
|---|---|---|
| | Specific | Range |
| Urea-mineral-vitamin concentrate (Example 22) | 6 | 5-10 |
| Oat hulls | 10 | 0-15 |
| Ground corn cobs | 39 | 10-60 |
| Straw | 35 | 10-50 |
| Beet pulp | 5 | 0-10 |
| Citrus pulp | 5 | 0-0 |
| Total | 100 | 100 |

Example 28

| Ingredient | Percent | |
|---|---|---|
| | Specific | Range |
| Urea-mineral-vitamin concentrate (Example 23) | 6 | 5-10 |
| Ground corn cobs | 69 | 0-95 |
| Straw* | 25 | 0-95 |
| Total | 100 | 100 |

*Oat hulls may be used in place of the straw.

A typical example of a complete feed composition embodying the present invention, suitable for dairy cattle, is as follows.

| Ingredient: | Parts by weight |
|---|---|
| Ground barley | 600 |
| Crimped oats | 600 |
| Wheat bran | 600 |
| Cane molasses | 200 |
| Urea-mineral-vitamin concentrate (Example CC) | ¹ 120 |
| | 2,120 |

¹ Supplies about 46% of the total protein-equivalent.

A typical example of a complete feed composition embodying the present invention, suitable for beef cattle, is as follows.

| Ingredient: | Parts by weight |
|---|---|
| Crimped oats | 700 |
| Ground barley | 500 |
| Ground corn cobs | 510 |
| Cane molasses | 150 |
| Urea-mineral-vitamin concentrate (Example DD) | ² 140 |
| | 2,000 |

² Supplies about 54% of the total protein-equivalent.

A typical example of a complete feed composition embodying the present invention, suitable for dairy cattle, beef cattle in feed lots, and for the finish feeding of other ruminants, may be prepared by grinding and mixing the following ingredients in the following proportions.

| Ingredient: | Parts by weight |
|---|---|
| Timothy hay | 900 |
| Crimped oats | 400 |
| Ground corn | 400 |
| Molasses | 200 |
| Urea-mineral-vitamin concentrate (Example EE) | ³ 140 |
| | 2,040 |

³ Supplies about 52.5% of the total protein-equivalent.

I claim:

1. A composition for the feeding of ruminants comprising (a) nutritionally balanced quantities of carbohydrates, fiber, and protein, and (b) as a supplementary source of nitrogen and other mineral nutrients, from about 1% to about 12% by weight of the feed, of a feed concentrate comprising a mixture of from about 15% to about 75% by weight of at least one molecular addition complex of unsubstituted urea with a nutrient inorganic compound selected from the group consisting of a nutrient mineral acid and a nutrient metal salt of an inorganic acid, and a nutrient carrier.

2. The composition of claim 1 in which the addition complex is urea-calcium sulfate.

3. The composition of claim 1 in which the addition complex is urea-phosphoric acid.

4. The composition of claim 1 in which the addition complex is urea-sodium chloride-water.

5. The feed composition of claim 1 in which the nutrient carrier is calcium carbonate.

6. A feed concentrate for fortifying feed compositions for ruminants comprising from about 5 to 35 parts by weight of urea-phosphoric acid, 5 to 50 parts by weight of urea-calcium sulfate, 5 to 40 parts by weight of urea-sodium chloride-water, 0.5 to 50 parts by weight of urea, and 0.5 to 35 parts by weight of calcium carbonate.

7. A feed concentrate for fortifying feed compositions for ruminants comprising a dry mixture of 17.35% urea-phosphoric acid, 22.95% urea-calcium sulfate, 19.85% urea-sodium chloride-water, 28.35% urea, and 11.50% calcium carbonate.

8. A composition for the feeding of ruminants comprising nutrient material including carbohydrates, fiber and protein, and as a supplementary source of nitrogen and other mineral nutrients, about 5.9% by weight of the feed concentrate of claim 7.

9. A composition for the feeding of ruminants comprising (a) nutritionally balanced quantities of carbohydrates, fiber, and protein, and (b) as a supplementary source of nitrogen and other mineral nutrients, from about 1% to about 12% by weight of the feed of a feed concentrate comprising a mixture of from about 15% to about 75% by weight of at least one molecular addition complex of unsubstituted urea with a nutrient inorganic compound selected from the group consisting of a nutrient mineral acid and a nutrient metal salt of an inorganic acid, from about 15% to about 30% by weight of urea, and a nutrient carrier.

References Cited by the Examiner

UNITED STATES PATENTS

| 1,440,056 | 12/22 | Clarkson et al. | 260—555 |
| 2,074,880 | 3/27 | Whittaker et al. | 260—555 |
| 2,875,060 | 2/59 | Holman | 260—555 |
| 2,980,733 | 4/61 | Sowa | 260—555 |

A. LOUIS MONACELL, *Primary Examiner.*